Jan. 19, 1960 W. C. RUDD 2,922,019

WELDING OF LENGTHS OF TUBING

Filed Nov. 14, 1958

INVENTOR:
WALLACE C. RUDD.
BY
Ward Neal Haselton Orme & McElhannon
ATTORNEYS.

United States Patent Office 2,922,019

Patented Jan. 19, 1960

2,922,019

WELDING OF LENGTHS OF TUBING

Wallace C. Rudd, Larchmont, N.Y., assignor to Magnetic Heating Corp., New Rochelle, N. Y., a corporation of New York Application November 14, 1958, Serial No. 774,038

8 Claims. (Cl. 219—67)

This invention relates to methods for welding by the use of high frequency resistance heating and more particularly the invention relates to and is adapted for the welding of seams in a succession of finite lengths of metal tubing, also the welding together of succeeeding pairs of strips or other metal portions of finite length, as well as the resulting products.

Reference is made to the U.S. Patent of Wallace C. Rudd and Robert J. Stanton No. 2,818,488, granted on December 31, 1957, which discloses methods and apparatus for welding a longitudinal seam in metal tubing or other metal elements by the application of the terminals of a source of high frequency current to the opposite sides respectively of a gap between the metal portions to be welded and at points shortly in advance of the weld point where the portions are brought together under pressure, the current flowing from the points of application at the gap edges to and from the weld point, so that the edges which are to be welded together, as they approach each other with a V-shaped gap therebetween, are heated to welding temperature as they approach a point.

Such method and apparatus have gone into extensive and highly successful use for the welding of continuous lengths of tubing and strips. However, if the lengths of tubing or strips which are to be welded are relatively short, such method has the disadvantage that the very forward portion as well as the trailing end portion of the seam cannot be welded by such methods for the following reasons. Since the metal portions which are being advanced and which are separated by a V-shaped gap in advance of the weld point, have to be brought together under pressure at the weld point, a "seam guide" or spreader element has to be interposed between the edges at some point substantially in advance of the weld point to hold the edges separated with a predetermined gap therebetween until they come together in the V-formation at the weld point. But when the forward end of a piece of tubing, for example, is introduced to the apparatus with a gap along the line of the desired seam, while the respective edges of such gap may be promptly engaged by the contacts which apply the high frequency current thereto, the gap will not assume a V-formation until the forward ends of the gap edges reach and are pressed together at the weld point, where means is provided, such as pressure rollers, for pressing them together. Thus the forward end of the tube will advance for a distance about equal to the distance between the contacts and the weld point before the edges come together to form a complete V-shaped path for the heating current. Thus a length of the forward portion of the tube, equal to about the distance between the contacts and the weld point, will remain largely unwelded. And at the trailing end of the gap between the edges to be welded, as soon as the trailing ends pass the seam guide or spreader, they will tend to snap together, closing the gap, because of the pressure-applying means at the weld point, and thus the high frequency current paths along the edges will then become short-circuited and as a result the trailing end portion of the seam will not be properly heated or welded.

The present invention provides a way of overcoming this difficulty and permitting a succession of finite lengths of tubing or strips to be secured together with a welded seam, with the weld starting from the very forward ends of the tube lengths and extending to the very ends at the trailing portions thereof. To accomplish this purpose in accordance with the invention, finite-length metal tubes for example, are arranged in succession end to end, and where the abutting end portions thereof come into engagement, the trailing ends are formed with a recess (which extends to either side of the line of the desired seam) while the forward ends of the succeeding tube lengths are formed with forwardly directed projections at each side of the seam line, which projections extend into said recesses. Accordingly, when one of the lengths of tubing, with the V-shaped gap therein, is passing the weld point, said projections on a succeeding length of tubing as engaged in said recesses, will prevent the V-shaped gap from snapping to closed condition as its trailing end passes the seam guide or spreader. That is, in the succeeding tube length, the spreader will be keeping the gap open and thus the projections on such succeeding length will keep the trailing end of the V-shaped gap on the preceding section open for the required interval of time. And as the pressure rollers adjacent the weld point close the V-shaped gap, said projections on the succeeding tube lengths will be engaged in said recesses, whereby the gap in the succeeding length of tubing will start to assume the V-formation at the proper time.

In this way, a continuous succession of tubes of finite length, or a succession of pairs of strips to be welded together, may be passed through the apparatus, with no interruption of the welding or interference with proper welding at or adjacent the abutting ends of the successive lengths, once the succession has been started through the apparatus.

Thus the method results in a product comprising a succession of tubes or other metal portions, each of finite length, assembled end to end and with a welded seam extending continuously from near the forward end of initial member longitudinally of the succession of members to a point near the end of the final member of the succession. And the succeeding members will have, at the successive abutting ends, interengaging projections and recesses holding the successive members in alignment, so that they may be automatically advanced, if desired, to further processing steps, or the successive members may be separated. In the latter event, the ends of each member may be cut off to eliminate the projections and recesses and at the same time to "square up" the ends as is generally the desirable practice in any event.

Hence with the invention, a continuous succession of tubes or strips may be welded without interruption, even though each is of some predetermined finite length. In the case of tubing for instance, each tube portion might for example be from several inches up to 30 or 40 feet or more in length, as is true also in case the invention is used for welding together metal strips or the like.

Various further and more specific objects, features and advantages of the invention will appear from the description given below, taken in connection with the accompanying drawings, illustrating by way of example preferred forms of the invention.

Figures 1, 2, 3, 4:
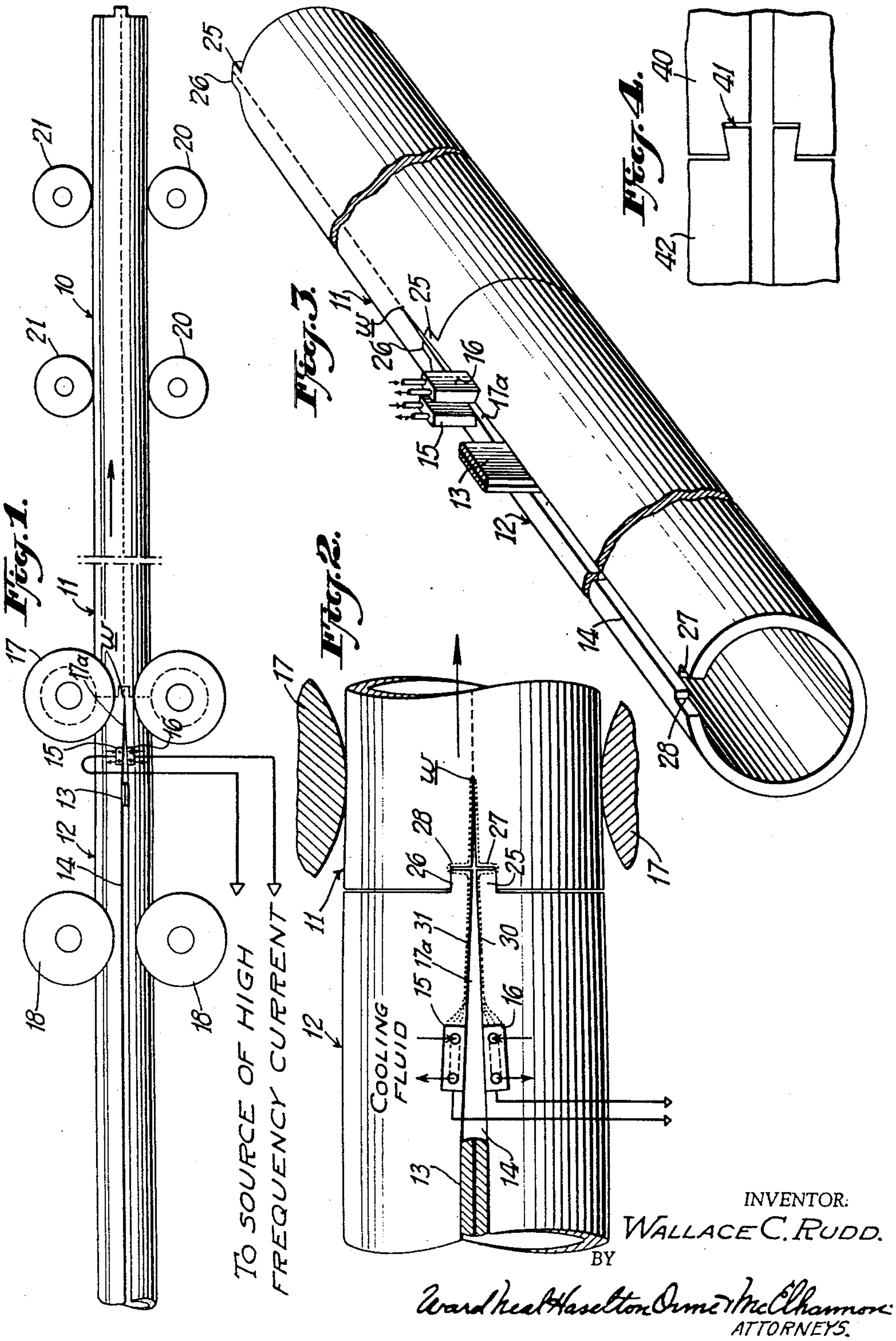
Fig. 1 is a somewhat schematic view of a preferred arrangement for carrying out the invention.
Fig. 2 is an enlarged view of that portion of the arrangement in the region where the welding occurs.
Fig. 3 is a perspective view.
Fig. 4 is a view broken away showing an alternative form of projection and recess formation which may be used on the tube or strip lengths being welded in accordance with the invention.

Referring to the drawings in further detail, as shown in Fig. 1, a succession of lengths of tubing as at 10, 11 and 12 are shown, proceeding through the apparatus end to end longitudinally in the direction indicated by the arrow, past a spreader or so-called seam guide 13 of a suitable known form, which holds in predetermined spaced relation the edges at the opposite sides of a gap 14 in the tube.

Thence the tubing passes suitably fluid-cooled contacts, as at 15, 16, as disclosed in the above-mentioned patent, and to which the terminals respectively of a source of high frequency current are applied, as indicated, whereby such current flows from such contacts along on the opposed edges of the V-shaped gap portion 17*a* to and from the weld point *w*, causing such edges to be heated up to welding temperature at about the moment when the successive points thereon arrive at said weld point. As disclosed in said patent, the current used may be of a frequency of the order of about 100,000 cycles per second or higher and various expedients may be used, as disclosed in said patent and in U.S. patent to Robert J. Stanton et al. No. 2,833,910, for controlling and concentrating the flows of current along on the edge surfaces of the V-shaped gap. Also, as disclosed in said patents, the gap may be closed under pressure at the weld point as by pressure applying rollers 17. Suitable roller means or other guiding and supporting means, including rollers as at 18, may be used for guiding the successive tube lengths into the equipment as shown, and the successive tube lengths, after the seams have been welded, may be supported and guided along further by any suitable further known forms of means, including opposed pairs of rollers as at 20, 21.

As more clearly shown in Figs. 2 and 3, the forward ends of each tube length prior to being introduced into the apparatus, is formed with a pair of projections as at 25, 26, located respectively at or adjacent, but on opposite sides of the line of the desired seam. Also, as best shown at the lower end of Fig. 3, each tube length at its trailing end edge is formed at each side of the gap 14 with recesses as at 27, 28, preferably of the same or approximately the same dimensions as said projections. As the succession of tube lengths are assembled for passage through the apparatus, these projections are brought into engagement with the recesses, as best shown in Fig. 2. These projections and recesses thus will not only hold the succeeding tube lengths or sections in alignment at the region of the desired welded seam, but also, as the length 11, for example, passes the pressure rollers 17 and the weld point, the projections on the succeeding tube length will engage under pressure the longitudinal walls of the recesses, thereby preventing the V-shaped gap 17*a* from snapping to closed condition as the abutting ends of succeeding sections pass the contacts on their way to the weld point. That is, the seam guide or spreader 13 will keep the gap 14 open, and thus keeping the projections 25, 26 in spaced-apart condition, so that they in turn will keep the opposed edges of the gap on the tube length 11 in open V-shaped formation until the proper moment when it is closed at the weld point, and a succeeding V-shaped gap formation occurs in the succeeding tube length 12. Accordingly, the welding of the seam will proceed continuously without any objectionable interruption at the points where the succeeding tube lengths abut in end to end relation.

It may be further noted that the high frequency current as it flows along on the edge surfaces of the V-shaped gap along paths as indicated by dotted lines at 30, 31, will, for practical purposes, continue to flow along on these edge surfaces and properly heat the same, notwithstanding the occurrence of the interengaging projections and recesses. However, the exact path which the high frequency currents will follow in passing from the projections 25, 26 to the walls of the recesses 27, 28, may vary somewhat but without any objectionable results, depending upon the particular manner in which the projections engage in the recesses. For example, as may be preferred, if there is a slight gap, as indicated in Fig. 2, between the forward ends of the projections and the forward walls of the recesses, then the proximity effect with the high frequency current used may be such that it will follow paths (as indicated in dotted lines in Fig. 2) which extend along such gap to and from the outer walls of the recesses where the outer walls of the projections press against the outer walls of the recesses in firm contact therewith. But this will cause no objectionable interruption of the proper heating of the edge surfaces of the gap.

As the tube lengths proceed beyond the weld point, they will remain as an assembled succession which may be advanced as such to subsequent treating operations, if desired, or at a suitable point, the successive sections may be separated. If the advancing end edges of the projections are made short enough so that they remain slightly spaced from the end walls of the recesses, as shown in Fig. 3, then there will be little or no tendency for the projections to become welded in the recesses, although a slight welding effect at these points may be obtained, if desired, by substantially avoiding spaces at the forward ends of the projections. Even if the succeeding sections are to a slight degree welded together at the projections, they may be readily broken apart for separation at the desired stage in the processing of the tubing.

It will be understood that, while Figs. 1, 2 and 3 have been described more particularly as being used for welding successive lengths of tubing, like principles and methods may be used for welding a longitudinal seam along between the edges of any metal portions such as strips or the like.

While in Figs. 2 and 3, the projections and recesses are shown as of rectangular shape, if desired they may be shaped similar to the mortise and tenon portions of a dovetail joint, as indicated in Fig. 4, where a trailing end portion of a tube length or strip assembly is indicated at 40, interlocked as by dovetail joint means at 41 with the forward portion of a succeeding tube length or strip assembly 42. With this form of projection and recess engagement, it will be apparent that the succeeding lengths are in effect locked against separation in longitudinal directions and this may facilitate the proper advancing of the succeeding parts through the apparatus in proper alignment and even partly or wholly by pulling forces applied at the outgoing end of the succession.

After the successive lengths have been welded and subsequently separated, the end portions of each length may be cut off, if desired, thereby eliminating the projections and recesses and any other irregularities that the end portions may have.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding opposed longitudinal edge portions of successions of metal elements to one another, respectively, which comprises: advancing the edge portions past a weld point and longitudinally of the direction of the desired welded seam therebetween, the succeeding metal elements of each succession being advanced in end-to-end relation; forcing the edge portions together under pressure at the weld point while a V-shaped gap remains therebetween in advance of the weld point; applying high frequency current to heat the approaching edges at opposite sides of such gap up to welding temperature substantially by the time same reach the weld point; providing the trailing ends of the metal elements with recesses adjacent the line of the desired seam; providing the forward ends of the succeeding metal elements with projections for engaging such recesses; and providing spreader means to engage the metal elements and maintain a predetermined gap therebetween at a substantial distance in advance of the weld point, said projections being held prior to reaching the weld point in spaced-apart position by reason of said spreader means and the projections acting to engage said recesses on preceding elements to prevent the V-shaped gap therebetween from being closed substantially prior to the weld point.

2. Method in accordance with claim 1 and in which the metal elements comprise opposed edge portions on opposite sides of longitudinal gaps in lengths of metal tubing, which gaps are closed and such edge portions are welded together as same pass the weld point.

3. Method in accordance with claim 1 and in which one of said recesses is provided at each side of the line of the desired seam at the trailing end of each metal element and one of said projections is provided at each side of the line of the desired seam on the forward end of each metal element and of dimensions substantially to fit the corresponding recesses.

4. Method in accordance with claim 1 and in which one of said recesses is provided at each side of the line of the desired seam at the trailing end of each metal element and one of said projections is provided at each side of the line of the desired seam on the forward end of each metal element and of dimensions substantially to fit the corresponding recesses, the recesses and projections also being of a shape to provide a dovetail-joint form of connection.

5. Method for forming a longitudinal welded seam between two opposed regions of successive metal elements, respectively, which comprises: advancing the successions with the metal elements of each in end-to-end relation, longitudinally past a weld point where the regions to be welded are brought together under pressure at the vertex of a V-shaped gap therebetween; heating the regions which come into contact up to welding temperature by the time same reach the weld point; maintaining the opposed metal regions substantially in advance of said weld point with a predetermined gap therebetween; providing the trailing ends of the metal elements and the forward ends of the succeeding elements with interengaging parts, whereby when each two opposed metal regions are brought together at the weld point, the gap therebetween is prevented from closing substantially in advance of the weld point, by reason of said interengaging parts.

6. Method in accordance with claim 5 and in which the metal regions comprise opposed edge portions on opposite sides of longitudinal gaps in lengths of metal tubing, which gaps are closed and such edge portions are welded together as same pass the weld point.

7. Method in accordance with the foregoing claim 5 and in which the interengaging parts comprise recesses on the trailing ends of the metal elements and projections on the forward ends thereof, said recesses and projections being shaped to interengage as a dovetail joint partly on one side of the gap and partly on the other.

8. The novel product comprising successions of opposed metal elements, said elements being secured to one another by a welded seam extending longitudinally of the elements, each of said successions of elements constituting portions of finite length and being in end-to-end relation, the trailing end of each succession being formed with a recess at each side of the welded seam and the forward end of each succession being formed with a projection at each side of the welded seam, which projections substantially fit in said recesses and act to retain the welded together elements in alignment along the welded seam.

No references cited.